(12) United States Patent
Boodman et al.

(10) Patent No.: US 8,407,584 B1
(45) Date of Patent: *Mar. 26, 2013

(54) STABLE AND SECURE USE OF CONTENT SCRIPTS IN BROWSER EXTENSIONS

(75) Inventors: Aaron Boodman, San Francisco, CA (US); Adam Barth, Stanford, CA (US); Matthew Perry, San Francisco, CA (US); Erik Kay, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,789

(22) Filed: Sep. 27, 2011

Related U.S. Application Data

(63) Continuation of application No. 13/110,796, filed on May 18, 2011.

(60) Provisional application No. 61/345,999, filed on May 18, 2010, provisional application No. 61/346,000, filed on May 18, 2010, provisional application No. 61/346,013, filed on May 18, 2010.

(51) Int. Cl.
*G06F 21/00* (2006.01)
(52) U.S. Cl. .................... 715/234; 719/313; 726/22
(58) Field of Classification Search .................... None
See application file for complete search history.

(56) References Cited

U.S. PATENT DOCUMENTS

| | | | |
|---|---|---|---|
| 2002/0129000 A1* | 9/2002 | Pillai et al. ........................ | 707/1 |
| 2004/0054918 A1* | 3/2004 | Duri et al. ..................... | 713/200 |
| 2005/0039197 A1* | 2/2005 | Ahmad et al. ................ | 719/331 |
| 2007/0016949 A1* | 1/2007 | Dunagan et al. ............... | 726/22 |
| 2007/0233686 A1* | 10/2007 | Bernabeu-Auban et al. ..... | 707/9 |
| 2007/0239985 A1* | 10/2007 | Bernabeu-Auban et al. . | 713/168 |
| 2007/0256003 A1* | 11/2007 | Wagoner et al. ........... | 715/501.1 |
| 2008/0313648 A1* | 12/2008 | Wang et al. .................... | 719/315 |
| 2009/0141299 A1* | 6/2009 | Osada .......................... | 358/1.13 |
| 2010/0281537 A1* | 11/2010 | Wang et al. .................... | 726/22 |
| 2011/0047613 A1* | 2/2011 | Walsh ............................. | 726/16 |

OTHER PUBLICATIONS

McCloud, Scott, et al., Google Chrome—Behind the Open Source Browser Project, pub. 2008.*
Mark Pilgrim, "Dive Into Greasemonkey", May 9, 2005, 99 pages.
Non-Final Office Action for U.S. Appl. No. 13/110,796, mailed May 23, 2012, 19 pages.

* cited by examiner

*Primary Examiner* — Stephen Hong
*Assistant Examiner* — Keith Bloomquist
(74) *Attorney, Agent, or Firm* — Brake Hughes Bellermann LLP

(57) ABSTRACT

A rendering engine may be configured to execute, within a first execution environment, a page script of a page to be rendered within a browser interface, the page script configured to interact with a page model to implement the rendering. An extension manager may be configured to execute an extension file which modifies a functionality of a browser application in association with the rendering of the page, including detecting a content script associated with the extension file which, during execution, interacts with the page model. An environment manager may be configured to create a second execution environment for execution of the content script file therein by the rendering engine.

15 Claims, 6 Drawing Sheets

STABLE AND SECURE USE OF CONTENT SCRIPTS IN BROWSER EXTENSIONS

CROSS REFERENCE TO RELATED APPLICATIONS

This application is a continuation of, and claims the benefit under 35 U.S.C. §120 of, U.S. patent application Ser. No. 13/110,796, filed May 18, 2011, and titled "STABLE AND SECURE USE OF CONTENT SCRIPTS IN BROWSER EXTENSIONS," which itself claims the benefit, under 35 U.S.C. §119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these patent applications are incorporated herein by reference in their entirety.

TECHNICAL FIELD

This description relates to browser extensions.

BACKGROUND

Browsers typically enable users to interact with and experience many different types of content, usually over a computer network, and often in a visual or graphical manner. For example, users may install one or more internet browsers on a local computing device, and may thereafter utilize the internet browser to access content and/or functionality provided by a remote computing device.

Many browser applications provide a user with an ability to customize or personalize an appearance or functionality of the browser application in a manner desired by the user. In this way, the user may be more likely to enjoy, or benefit from, a use of the browser application. In particular, many browser applications support the use of discrete programs or files which are designed to provide a specific addition and/or alteration of one or more functionalities of an associated browser application. Such programs may be referred to using various, well-known terminologies, such as, for example, extensions, add-ons, or web apps (or just apps).

As referenced above, such programs generally operate to provide some additional, specific functionality for a user's local browser application. For example, such programs may cause an icon, image, or other content to be available within the context of the browser application, which would not normally be available to the user in that context. In such examples, such extension programs merely supplement already-present features and functionalities of the browser application.

In some cases, however, such extension programs may utilize a content script or other executable code which is designed to interact with content that is being remotely accessed by the browser application for loading and rendering thereof. For example, in the case where the browser application accesses a remote webpage over the internet, such content script or other executable code associated with an extension program may be configured to interact with (e.g., read or make changes to) the webpage itself.

Use of such interactions, content scripts, or other executable codes in the context of extensions may inadvertently disrupt an operation or proper display of the webpage in question, or other operation(s) of the rendering browser application. Moreover, in some cases, such interactions between content scripts and webpages may pose a security risk, such as, for example, when the interactions enable the webpage or the content script to access confidential or other privileged data of the user that may be stored on the local computing device of the user. As a result, users' use and enjoyment of extension programs utilizing such content scripts or other similar types of executable code may have undesirable results, and/or may be undesirably restricted in an attempt to avoid such undesirable results.

SUMMARY

According to one general aspect, a computer system may include instructions stored on a computer-readable medium and executable by at least one processor to execute a browser application and thereby provide a browser interface. The computer system may include a rendering engine configured to cause the at least one processor to execute, within a first execution environment, a page script of a page to be rendered within the browser interface, the page script configured to interact with a page model to implement the rendering. The computer system may include an extension manager configured to cause the at least one processor to execute an extension file which modifies a functionality of the browser application in association with the rendering of the page, including detecting a content script associated with the extension file which, during execution, interacts with the page model. The computer system may include an environment manager which is configured to cause the at least one processor to create a second execution environment for execution of the content script file therein by the rendering engine.

According to another general aspect, a computer program product may be tangibly embodied on a computer-readable medium and may include executable code that, when executed, is configured to cause a data processing apparatus to execute, within a first execution environment, a page script of a page to be rendered, by a rendering engine, within a browser interface of a browser application, the page script configured to interact with a page model to implement the rendering. The executable code, when executed, may be further configured to cause the data processing apparatus to execute an extension file which modifies a functionality of the browser application in association with the rendering of the page, including detecting a content script associated with the extension file which, during execution, interacts with the page model, and to create a second execution environment for execution of the content script file therein by the rendering engine.

According to another general aspect, a computer-implemented method may include executing instructions stored on a computer-readable medium. The method may include executing, within a first execution environment, a page script of a page to be rendered, by a rendering engine, within a browser interface of a browser application, the page script configured to interact with a page model to implement the rendering. The method may include executing an extension file which modifies a functionality of the browser application in association with the rendering of the page, including detecting a content script associated with the extension file which, during execution, interacts with the page model, and creating a second execution environment for execution of the content script file therein by the rendering engine.

The details of one or more implementations are set forth in the accompanying drawings and the description below. Other features will be apparent from the description and drawings, and from the claims.

DETAILED DESCRIPTION

Figure 1A:
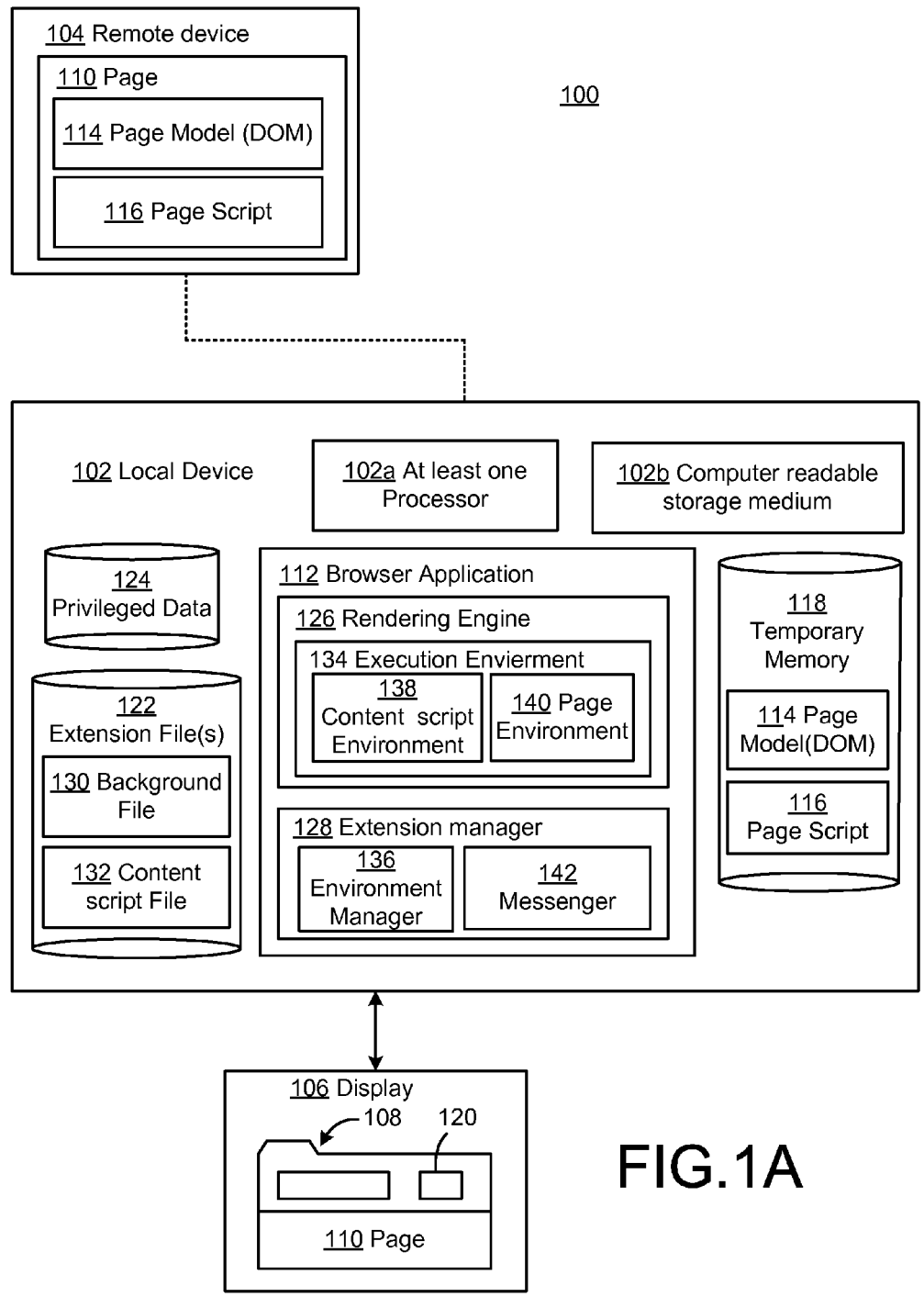
FIG. 1A is a block diagram of a system for providing stable and secure use of extension content scripts.

FIG. 1A is a block diagram of a system 100a for providing stable, secure use of content scripts associated with browser extensions. In the example of FIG. 1, a local computing device 102 is illustrated as communicating with a remote computing device 104 in order to provide, using a display 106, a browser window 108 which contains a page 110 that is stored at the remote device 104. As described in detail below, the local device 102 may be configured to provide the browser window 108 and/or the page 110 in a manner which is highly customizable to a user of the system 100a, without providing a risk to the stable operation and display of the page 110 and/or the browser window 108 itself, and in a manner which minimizes a security risk to a user of the system 100a, or other users.

As may be appreciated by one of skill in the art, a local device 102 may generally represent virtually any computing device which may be configured to execute an otherwise conventional browser application 112, and to communicate with the remote device 104. For example, the local device 102 may include any standard desktop or personal computing device, any laptop, notebook, or netbook computer, any tablet computer, or any Smartphone or other mobile computing device. Such computing devices, and other computing devices, may be configured to access the remote device 104 over one or more computer networks, in any conventional manner. For example, many local devices 102 may include various types of network-related hardware/software which enable the local device 102 to communicate over the public internet, private intranet, or other network, to thereby access the remote device 104. Consequently, the display 106 may be understood to represent virtually any conventional type of display, e.g., monitor, touch-screen, or any other type of visual or auditory display.

In the examples that follow, it is generally assumed that the local device 102 and the browser application 112 communicate with the remote device 104 over the public internet, therefore typically using standard and conventional protocols for identifying, accessing, and rendering the page 110, e.g., from a web server represented by the remote device 104. However, it will be appreciated that such examples are provided merely for the sake of clarity and conciseness, and, as just referenced above, are not intended to be limiting of the various manners in which the local device 102 may obtain, process, or provide content in association with the browser application 112 and the browser window 108.

Thus, in the types of examples just referenced, it may generally be assumed that the page 110 represents any of the many types of webpages which are available over the public internet. For example, in a simple scenario, the page 110 may represent a substantially static page which includes text, sound, images, or other content which may be desired by a user of the system 100a and which may be displayed within the browser window 108. In other well-known examples, the page 110 may include many types of dynamic or interactive content, which often may be manipulated by the user within the context of the browser window 108. In many scenarios, the page 110 and/or associated executable code may be understood to represent an application which may execute partially or completely at the remote device 104 (e.g., may utilize the processor, memory, and other hardware/software resources of the remote device 104), while providing associated functionality and features to the user via the browser window 108 (and perhaps executing at least partially locally at the local device 102). As just referenced, such webpages and associated functionalities and applications are well-known to be implementable using various, conventional programming languages and techniques, such as, for example, hypertext markup language (HTML), Asynchronous Javascript (AJAX), eXtensible Markup Language (XML), JavaScript, JavaScript object notation (JSON), and many other types of code which may be executed.

Thus, in the example of FIG. 1A, the page 110 at the remote device 104 is illustrated as including, or being associated with, a page model 114 and a page script 116. The use of such page models and scripts is well known, including the specific examples of such use that are provided herein. Generally speaking, the page model 114 is known to provide a data structure which defines the structure, content, and appearance of the page 110 with respect to a programming language in which the page 110 is written. Meanwhile, the page script 116 is generally known to be configured to, when executed, traverse the data structure of the page model 114 in a particular, specified manner, so as to thereby enable the browser application 112 to render the page 110 in a desired manner.

In specific examples described herein, and well known in the art, the page model 114 may represent a document object model (DOM) data structure. Such a DOM, as just referenced, represents a data structure (typically, a tree-like data structure) that itself represents HTML of the page 110. Meanwhile, the page script 116 in such examples may be represented by JavaScript code which, when executed, is configured to traverse the DOM tree of the page model 114 to thereby render the page 110, as is well-known and as referenced above. Specific examples of the page model 114 and the page script 116 would be apparent, and are provided in more detail below, e.g., with respect to FIG. 1B.

Thus, during a conventional rendering of the page 110 by the browser application 112, a temporary memory, (e.g., a cache memory) at the local computing device 102 may be used to temporarily store the page model 114 and the page script 116. Of course, this is merely an example, and it may be appreciated that the browser application 112 may partially or completely access the page model 114 and/or the page script 116 remotely at the remote device 104. In this way, the browser application 112 may utilize the page model 114 and the page script 116, e.g., in a conventional manner, so as to thereby render the page 110 within the browser window 108 provided by the browser application 112.

As described herein, browser extensions may be utilized in the system 100a to provide additional features or functionalities in association with the browser application 112, and thus with respect to the browser window 108. In the example of FIG. 1A, an icon 120 represents an icon which is provided in conjunction with the browser application 112 and the browser window 108, so as to provide an example of such extended features/functionalities. More specifically, as shown, the extension icon 120 may be produced by, or in conjunction with, various extension files 122.

In this regard, as may be understood from the above description, or as would be apparent to one of skill in the art, extensions defined by the extension files 122 may generally refer to browser extensions, add-ons, active X controls, web applications (web apps, apps) or any other program code which is designed to augment an appearance or functionality of the browser application 112 in providing the browser window 108 and/or the example page 110. As such, the extension files 122 may include one or more of various types of files, such as, for example, HTML files, cascading style sheets (CSS) files, JavaScript files, image files, audio files, text files, or virtually any other type of code or content that may be used to extend the features and functionalities provided by the browser application 112.

For example, some or all of the extension files 122 may be understood to be essentially indistinguishable in appearance, structure, and function with respect to otherwise conventional web pages which might be rendered by the browser application 112, and, as such, can use all the functionality of the browser application 112 with respect to the rendering of webpages. For example, the extension files 122 representing webpages may use the various application program interfaces (APIs) that the browser application 112 provides to external webpages such as the page 110 (e.g., XML HTTP requests, JSON, or HTML 5 local storage, to name a few examples).

In additional examples of the extension files 122, associated extensions may provide functionality to the browser application 112, such as browser actions to be implemented by the browser application 112 when the extension in question is relevant to most or all pages to be rendered by the browser application 112 within the browser window 108. In other examples, extensions may include a page action which is associated with an execution which is dependent upon (or executed in conjunction with) a particular page or pages being rendered by the browser application 112.

Thus, with respect to the simplified example of the system 100a of FIG. 1A, a browser action of the extension files 122 may cause the extension icon to appear within the browser window essentially independently of the page 110, while, conversely, a page action associated with the extension icon 120 may cause the extension icon 120 to appear or disappear depending on its relationship to the page 110. Further, as is known, the extensions may be implemented automatically in conjunction with an operation of the browser application 112, e.g., in conjunction with the loading and rendering of the page 110. In other examples, extensions may interact programmatically with browser features, such as, e.g., bookmarks and tabs. That is, for example, an extension may be configured to execute in a manner that is dependent upon a user's selection (i.e., may execute only if such selection occurs) of a bookmark, tab, or other provided feature of the browser application 112.

In the simplified example of the system 100a of FIG. 1A, the extension files 122 are illustrated as being stored locally to the local computing device 102. For example, a user of the local computing device 102 may program and store the extension files 122 for use by the browser application 112. In additional or alternative examples, however, it may be appreciated that some or all of the extension files 122 may be accessed remotely. For example, in many cases, a particular extension may be packaged within a single folder or archive which may then be accessed by the browser application 112. For example, a provider and/or distributor of the extension files 122 (not specifically illustrated in the example of FIG. 1A) may construct and package the extension files 122, and a user of the system 100a may thereby download and install a desired extension, including accessing, downloading, and installing the extension files 122 at the local computing device 102, as shown.

In some scenarios, e.g., when the extension files 122 are stored locally to the local computing device 102 as shown, and because the extension files 122 may be associated with a personalized or customized modification of the browser application 112 which is unique or particular to a user of the system 100a, it may occur that the extension files 122 may have access to privileged data 124 of the user which may be stored at the local computing device 102, as shown. Although access to the privileged data 124 by the extension files 122 may thus enable such particular customization/personalization of the browser 112, such access also may represent a security risk with respect to a desired confidentiality level of the privileged data 124. For example, the privileged data 124 may include credit card information, social security number, or other private information associated with the user. In such cases, the extension files 122 may utilize such privileged data 124 in order to facilitate a user's interaction with the browser application 112 (e.g., by limiting a number of times that the user is required to enter credit card information into the browser window 108). However, as just referenced, and as described in detail below, such access to the privileged data 124 may represent a security risk to the confidentiality thereof. Specific examples of functions and features of the system 100a in mitigating or eliminating such security risks are provided in detail, below.

Thus, during normal operation, the browser application 112 may include a rendering engine 126 which is configured to render the browser window 108 and the page 110 within the display 106. As shown, the browser application 112 also may include an extension manager 128 which may be configured to facilitate operations of the rendering engine 126 with respect to the extension files 122, so as, for example, to facilitate the rendering engine 126 in rendering the extension icon 120, and in executing actions and other features associated with the rendering of the extension icon 120.

Of course, it may be appreciated that the browser application 112 may include, or be associated with, various features, functions, operational modules, or other elements which are not specifically illustrated in the context of FIG. 1A, but which would be apparent to one of skill in the art. Similarly, it may be appreciated that the terminology used in association with the rendering engine 126 and the extension manager 128 is merely for the sake of example, and that the various types of browser applications 112 which exist, or which may exist in the future, may use different terminology when referring to the various concepts described herein.

As referenced above, the extension files 122 may include various different types of files. For example, the extension files 122 may include a manifest file which gives information about the extension, such as, for example, the most important files and the capabilities that the extension might provide. In another example, as illustrated in the example of FIG. 1A, the extension files 122 may include a background file or background page which is generally known to represent an invisible page which holds the main logic of the extension, and which may thus run in the background so as to be always-available in case of some initiation of a relevant extension action. For example, for an extension installed on the local device 102 which includes the extension files 122, a browser action may be defined which have some affect on the rendering of the page 110 via the browser window 108. Thus, for example, the extension icon 120 may represent or be associated with such a browser action, and the background file 130 associated therewith may be defined by an HTML file which has JavaScript code that controls a behavior of the browser action associated with the extension icon 120. It may be appreciated that, as referenced above, the extension files 122 may include various other types of files. For example, the extension files 122 may include other types of HTML pages, such as, for example, an HTML page associated with the browser action providing a pop-up window in association with the browser window 108.

Thus, as described, HTML pages and associated code within the extension files 122 may include a background page associated with the background file 130, as well as a pop-up page associated with a corresponding pop-up file (not specifically illustrated in the example of FIG. 1A). In as much as such the files include HTML pages (webpages) which may otherwise be standard HTML/webpages but that are implemented in the context of extension files 122, it may occur that each such page itself, much like the page 110 at the remote device 104, may include corresponding page model (e.g., DOM), and associated page script (e.g., written in JavaScript). Generally speaking, such extension files and associated pages may have complete access to each other's DOMs, and may invoke functions on one another. As a result, such shared functions and other content may minimize the need to duplicate code within and among the various extension files/pages, since, as just referenced, a particular extension file may simply invoke or otherwise utilize desired code or other content from another extension file of a given extension.

Somewhat similarly, since the extension files may include web pages, the extension files 122, e.g., the background file 130, may execute in their own rendering process, analogous to the rendering engine 126. More specifically, with respect to the execution of the extension files 122, other than the content script file 132 as described below, execution thereof may proceed similarly to, but in a separate process than that of, the rendering engine 126 of the browser application 112. Thus, the extension manager 128 may represent, or be associated with, a separate process execution environment from that of the rendering engine 126, and therefore FIG. 1A may be said to provide a multi-process architecture for the execution of extension files 122. Such a multi-process architecture may help ensure, for example, that disruptions to execution of the extension files 122 do not affect operations of the browser application 112 as a whole, e.g., of the rendering engine 126. Moreover, such process separation helps protect the privileged data 124 and other confidential information of the user. For example, although not specifically illustrated in FIG. 1, such an extension process may occur within a sandbox or other known security/restricted execution realm, and may communicate with the rendering engine 126 using various message exchanges via associated APIs, rather than directly accessing or initiating relevant browser actions and related information.

As illustrated in the example of FIG. 1A, and as referenced above, the extension files 122 may include, or be associated with, a content script file 132. As is known, the content script file 132 may represent, or include, a content script which enables an associated extension to interact with webpages, e.g., the webpage 110. For example, the content script of the content script file 132 may be implemented as JavaScript that executes in the context of the page 110 as loaded into the browser application 112, as described in more detail herein. Thus, the content script 132 may be considered to be, in effect, part of a given loaded page, as compared to being considered to be part of an extension with which the content script was packaged. In other words, within the multi-process architecture described above, the content script 132 may be considered to be part of the process of the rendering engine 126, rather than the process of the extension itself within the extension manager 128. Consequently, as a matter of terminology, such an extension having packaging which includes the content script may be referred to as a parent extension of the content script file 132.

Content scripts, generally speaking, may be configured to, for example, read details of webpages visited by the browser application 112, and may be further configured to make changes to such pages. For example, as described in detail herein, the content script may be configured to read and/or modify the page model (e.g., DOM) 114 of the page 110. In example implementations, however, the content script may be restricted from accessing or modifying the page model (e.g., DOM) of the background page of the background file 130 associated with the parent extension of the content script file 132 (e.g., as part of the multi-process architecture described herein).

Nonetheless, as also described in detail herein, the content script 132 may be enabled to communicate with the background page of the relevant parent extension, or with other files/pages associated with the parent extension. For example, as described in detail below with respect to FIGS. 3 and 4, the content script may be enabled to exchange messages with its parent extension. For example, the content script might send such messages to the background page in response to some detected event, so as to thereby trigger a browser action or page action on the part of the background page. Additionally, the background page may be enabled to send a message to the content script, e.g., to request the content script to change the appearance of the relevant browser page, (e.g., the page 110) in a desired manner.

In more specific examples, the content script may include JavaScript files running in a context of the page 110 being rendered. Consequently, for example, the content script may be configured to identify unlinked uniform resource locators (URLs) within the webpage 110, and to convert them into hyperlinks. The content script may be configured to increase or decrease a font size of the page 110, and/or to identify and process specific types of data include within, or in association with, the page model 114. Of course, such potential functionalities of the content script file 132 are intended merely as non-limiting examples, and inasmuch as various functionalities of content scripts are well known in the art, they are therefore not described in additional detail herein, except as may be necessary or helpful in understanding operations of the system 100a of FIG. 1A.

In some example implementations, a given content script should always, or by default, be injected into the page 110 to be loaded. For example, such a content script may be registered in the manifest file with the corresponding extension. On the other hand, it may be desirable to inject or implement the content script based on a particular action or choice of the user in interacting with the browser window 108 (e.g., selecting a bookmark feature, a toolbar feature, or tab feature associated with the browser application 112). For example, the content script may be executed only in response to a selection of a particular bookmark functionality associated with the browser application 112. Such selective implementation of the content script may be referred to as programmatic injection or dynamic injection of a content script.

Further, it may be appreciated that although in the example of FIG. 1A only a single content script file 132 is illustrated, in fact, a given extension may be configured to insert multiple content scripts into the page 110 during the rendering thereof, where each such content script may have multiple JavaScripts, or other types of content script content. Additionally, or alternatively, a given content script may be configured to be injectable to a set of pages, but limited by the browser to work only in response to the user clicking on a browser action or page action button. For example, a given domain name may be associated with the web page 110 and may also be associated with a number of sub-domain web pages, and all of these related web pages may be associated with the extension icon 120 (or some other browser action or page action icon). Then, if and when the user navigates to a particular web page (e.g., the page 110) of this group and selects the extension icon 120, the content script may be injected into the web page 110 at that point (e.g., may interact with an associated DOM 114 at that point in the manner described herein). Such user-controlled dynamic content script injection may provide an additional aspect of security, since the user is provided with control over which web pages are actually accessible by a given content script.

It may be observed from the above description that, in the system 100a and similar systems, the content script may be loaded into the rendering engine to interact with the DOM 114 at a variety of times relative to the loading of the actual page 110 itself. For example, the content script may be loaded before the page itself is loaded, and/or in conjunction with (e.g., simultaneously with) the page in question. In such examples, functionality of the content script may be immediately and/or automatically available to the user. In other examples, the content script may be loaded/injected after the page 110 has already been loaded, where again such loading may be automatic or by default, or, as in the examples above, may be in response to some pre-specified user action performed with respect to the browser window 108 and/or the displayed page 110.

In additional examples, it may occur that the rendering engine 126, during normal operation thereof, may experience various idle times (or at least, times of relatively lower activity) during its rendering processes. For example, the rendering engine 126 may begin loading the page 110, but may be idle while waiting for a particular page portion or related data to be retrieved from the remote device 104. During such an idle time(s), the content script may be injected in a manner which is highly efficient and which optimizes the use of resources available at the local computing device 102. Further, such injection during available idle time enables injection of the content script into pages which have already been loaded or otherwise exist at a time when the content script is installed. Therefore, in the latter example, it is not necessary to require that the page be reloaded in order for the content script to be operable with respect thereto.

During operation, the rendering engine 126 may be configured to render the browser window/display 108 and/or the page 110 using an execution environment 134. Generally speaking, in a conventional setting, the rendering engine 126 may include an execution environment into which the page 110 (e.g., the page model 114 and the page script 116) may be loaded for execution of the page script 116 with respect to the page model 114, e.g., to thereby render the page 110. For example, as described in detail herein, the execution environment 134 may conventionally create a namespace associated with the page 110, where the created namespace may be associated with defined variables and associated values.

As also shown in the example of FIG. 1A, the browser application 112 may include an extension manager 128 which may be configured to implement some or all of the functionality of a particular extension, such as an extension associated with the extension files 122. For example, the extension manager 128 may be configured to cause the rendering engine 126 to execute or otherwise render particular files or pages associated with the extension of the extension files 122.

For example, as referenced above, the extension manager 128 may cause the rendering engine 126 to execute functionalities associated with the background file 130. In this context, as described and as is well known, the rendering engine 126 may thus execute or otherwise render the extension files, e.g., the background file 130, in a manner which causes the background file 130 to implement a browser, e.g., a browser action or page action. That is, such actions may be understood to represent supplemental or alternative actions associated with the rendering of the browser window 108 and/or the page 110 by the rendering engine 126, yet without requiring or permitting access to the page 110 by the background file 130.

For example, the background file 130 may be configured to modify the browser window 108 to include the extension icon 120. However, as may be appreciated, such an action, and associated actions, does not rely on an interaction between the background file 130 and the page model 114 of the page 110. Consequently, the background file 130 poses little or no risk to the stable or secure operation of the rendering engine 126 in rendering the browser window 108, the page 110, and/or the extension icon 120. That is, the background file 130 does not interact with the page 110 (e.g., with the page model 114), and therefore does not disrupt an operation thereof. Similarly, the lack of interaction between the background file 130 and the page 110 implies little or no access of the page 110 to the privileged data 124.

In contrast, as referenced above, the content script of the content script file 132 may be configured to interact with the page 110 (e.g., to interact with the page model 114 thereof). As a result, it is possible that such interactions between the content script and the page model 114 may lead to disruption of the rendering of the page 110 (e.g., by improperly removing or modifying a node object of the data structure of the page model 114). Moreover, as described herein, simultaneous loading and execution of the content script with the loading and execution of the page 110 may theoretically present a possibility that access of the content script to the privilege data 124 may be compromised, e.g., by malicious action on the part of the page 110.

As a result, as illustrated in the example of FIG. 1A and discussed in detail herein, the execution environment 134 may include separate, distinct, and/or isolated execution environments or sub-environments 138, 140. Specifically, as shown, the extension manager 128 may include or be associated with an environment manager 136 which may be configured to create and manage the separate execution environments 138, 140. That is, as shown, the environment manager 136 may be configured to segregate an execution environment 138 associated with execution of the content script 132 from an execution environment 140 associated with rendering of the page 110. By utilizing such separate and distinct execution environments, the environment manager 136 may be configured to minimize or eliminate the risks associated with the above referenced scenarios in which interaction of the content script with the page model 114 may cause a disruption to the stable and secure operation of the rendering engine 126 and rendering of the page 110. Specific examples of the separate, distinct environments 138, 140 are provided in detail below, e.g., with respect to FIG. 1B.

Further, as shown, the extension manager 128 may include a messenger 142, which may be configured to execute message exchanges between various extensions, and between the content script and its associated parent extension. As described, this layer of separation between the content script file 132 and the background file 130 may be instrumental in reducing or eliminating possibility that the execution of the content script may be associated with potential compromise of the privilege data 124. Specific example operations of the messenger 142 are provided in detail below, e.g., with respect to FIGS. 3 and 4.

In the example of FIG. 1A, the browser application 112 is illustrated including discrete functional modules. However, it may be appreciated that such illustration is merely for the sake of example, and that other implementations are possible. For example, a single element of the browser application 112 may be implemented by two or more elements. Conversely, two or more components of the browser application illustrated in FIG. 1A may be executed using a single component.

Further, in the example of FIG. 1A, the local computer device 132 is illustrated as including at least one processor 102a, as well as computer readable storage medium 102b. That is, for example, the local computing device 102 may rely on two or more processors executing in parallel to achieve a desired result. Meanwhile, the compute readable storage medium 102b may represent any conventional type of computer memory which may be used, for example, to store instructions which, when executed by the at least one processor 102a, cause the browser application 112 to perform various functions, and other relevant functions described herein. Additional or alternative example implementations of the system 100a of FIG. 1A are described herein, or would be apparent to one of skill in the art.

Figure 1B:
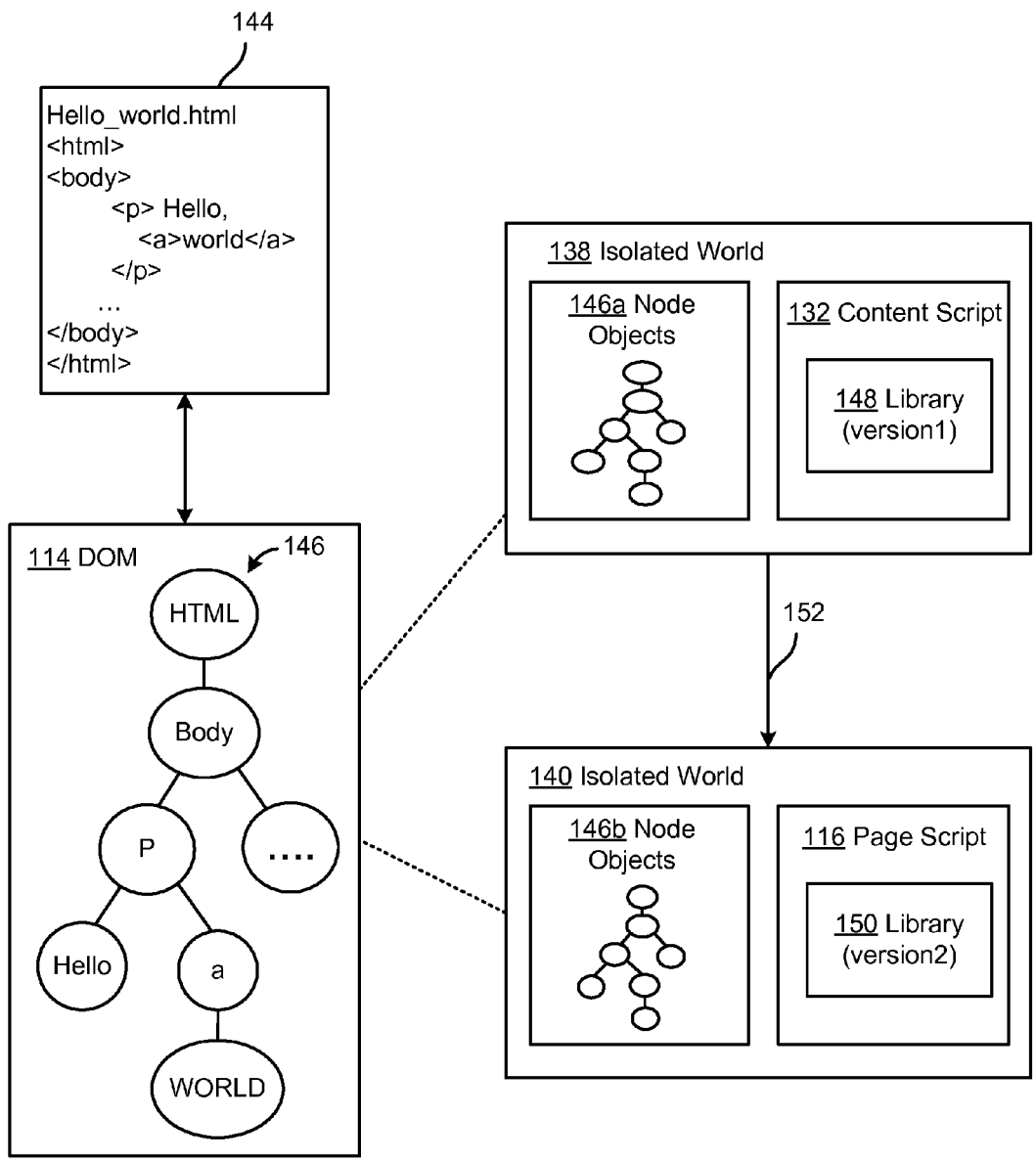
FIG. 1B is a block diagram illustrating access techniques for a content script accessing a page model of the system of FIG. 1A.

FIG. 1B is a block diagram illustrating an example implementation of the system 100a of FIG. 1A. In the example of FIG. 1B, a simplified example with webpage 144 is illustrated as including an HTML file "hello_world" which is designed to display the message "hello world."

As shown, in this example, the page model 114 may be implemented as a DOM which includes nodes or node objects 146 which represent the structure and content of the webpage 144. As also illustrated in the example of FIG. 1B, the execution environments 138, 140 may be implemented as "isolated worlds" in which the scripts 132, 116 may execute independently of one another.

In the example of FIG. 1B, the node objects 146 may be, for example, directly accessed within the isolated world of the execution environment 138, as represented by node objects 146a. Similarly, the node objects 146 may be directly accessed in an otherwise normal fashion by the page script 116 within the isolated world of the execution environment 140, as represented by node objects 146b.

FIG. 1B illustrates that the DOM 114 may, in this manner, be shared among all relevant scripts (e.g., the page script 116 as well as the content script 132), while execution of the scripts themselves may nonetheless be isolated from one another. In this environment, therefore, for example, the content script 132 may modify the DOM 114 (e.g., by adding or removing a node), and all other scripts (e.g., the page script 116) may thus observe such a change.

In other words, the content script 132 has access to the DOM 114 of the page 144 into which the content script 132 is injected, but does not have access to any page script (e.g., JavaScript), variables or functions created by, or associated with, the page script 116. Consequently, with respect to the content script 132, or other content scripts injected into the webpage 144, it may be impossible for each such content script to determine whether and how any other script is executing on the page in question. Conversely, the page script 116 may be unable to call any functions or access any variables defined by the content script 132 or other injected content scripts.

The structure of the isolated worlds 138, 140 may thus enable the content script 132 to make changes to its individual, e.g., JavaScript environment, without concern regarding conflicts with the page script 116, or with other content scripts. For example, as illustrated in the example of FIG. 1B, the content script 132 may be associated with, or may implement, a library file 148 that is used by the content script 132 as part of its injection into the page 144. For example, the library file 148 may represent a Jquery library file, or, more specifically, may represent a first version thereof. Meanwhile, the page script 116 may utilize or be associated with a second library file 150, which may represent a second or different version of the type of library file used in the content script 132. For example, the library file 150 may represent a second version of a Jquery library. Nonetheless, in the context of the example of FIG. 1B, it may be appreciated that the use of such different versions will not lead to inconsistencies, interference, or other conflicts. As a result, the content script 132 may be injected into many different webpages, which may or may not use the same version of the library file 148, without concern for such conflicts.

Another advantage provided by the use of the isolated worlds of the execution environments 138, 140 is that the page script 116 may be completely separated from the content script 132, as a result, extra functionality may be offered by way of the content script 132 that may not be desirable for access thereof by the page script 116.

Although the execution environments 138, 140 are isolated and separated from one another, they may, as shown in FIG. 1B, share access to the DOM 114 of the page 144. Therefore, the page script 116 may communicate with the content script 132, (or with the parent extension via the content script 132), and the page script 116 may do so through the shared DOM 114.

For example, custom DOM events and data stored in a known or defined location may be used to accomplish such communication. For example, a page which is not part of an extension may create a custom event which may be fired by setting event data to a known location in the DOM 114 and by dispatching the custom event. Consequently, the content script 132 may listen for the name of the custom event on a known element and handle the event by inspecting the data of the element, so that the message may be posted to the extension process. In this way, the page script 116 may establish a line of communication to the extension. Reverse examples of such communication may be implemented using similar techniques.

Many specific techniques may be available for implementing the examples of FIGS. 1A and 1B. For example, in conventional webpage JavaScripts, such as the page script 116, there may be a hierarchy of objects under a single global object (also referred to as a window object in a web browser context) of a webpage. In such settings, the global object represents a parent object for every child object and associated variables associated with the page script 116. Specifically, for example, all of the code of the page script 116 may execute in a single name space represented, and defined by, the global object or window object. For example, all such code may be represented or named using the format "window object/...". Consequently, all associated page elements (e.g., the DOM 114, associated functions, and associated html nodes) depend from the global object and execute in a particular JavaScript context associated with an execution environment thereof.

In the examples of FIGS. 1A and 1B, the isolated world of the execution environment 138 may be created by the environment manager 136 including the creation of a parallel/ shadow global window object which may be used as a wrapper to the conventional global object of the page script 116. Consequently, the content script may be provided with its own independent name space which is defined with respect to the parallel/shadow global window object. For example, a variable named X in the name space of the content script 132 may be associated with a value of 3, while a variable may have the same name X within the separate, distinct name space of the page script 116, and may therefore have a separate value (e.g., 5). As may be appreciated, the use of such distinct name spaces, as referenced above, may reduce or eliminate the possibility that operations of the scripts 132, 116 may conflict with one another.

In the example, due to the creation of the parallel/shadow global window object of the content script 132 being formed as a wrapper object with respect to the conventional global window object of the page script 116, the content script 132 may be enabled to access and effect the DOM 114. On the other hand, the page script 116 may be unable to effect the operation of the content script 132. Such one-way interaction between the isolated world 138 and the isolated world 140 is represented in the context of FIG. 1B by the one-way arrow 152 there between.

As referenced above, the examples of FIGS. 1A and 1B provide techniques for implementing the content script, and other content scripts, in a manner which ensures stable, secure operation of the content script 132 and of the page script 116. For example, such stable operation of the page script 116, and thus of the webpage 144, may be ensured by the separation of the execution environments 138, 140 and associated name spaces of the content script 132 and the page script 116. As a result, as described, the content script 132 which is stored at, or accessible by, the local computing device 102, may be injected as desired into virtually any webpage which is downloaded for display on the browser window 108, without the need for concern that the content script 132 will interfere with or otherwise disrupt operations of the associated page scripts of such pages.

From a security standpoint, as referenced above, it may be appreciated that the content script 132 and/or a parent extension thereof may have access to privileged information, (e.g., privileged APIs and/or privileged data), as represented in the example of FIG. 1A by the privilege data 124. However, as described, the page script 116 is not enabled to access the content script 132, and therefore may be prevented from obtaining unauthorized access to, or use of, such privileged information.

Figure 2:
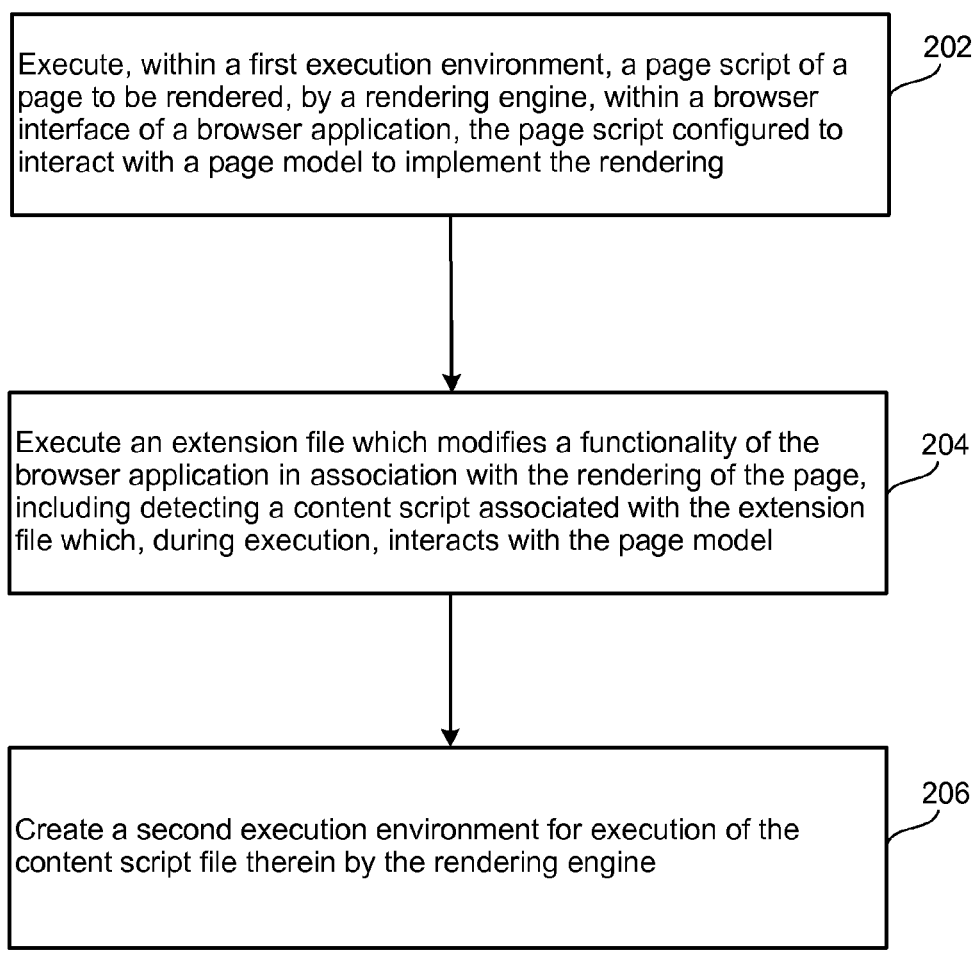
FIG. 2 is a flowchart illustrating example operations of the system 100a of FIG. 1A.

FIG. 2 is a flowchart 200 illustrating example operations of the system 100a in the examples of FIGS. 1A and 1B. In the example of FIG. 2, operations 202-206 are illustrated as discrete operations occurring in a sequential manner. However, it may be appreciated that the operations 202-206 may execute in a partially or completely overlapping (e.g., parallel) manner. Further, the operations 202-206 may occur in an order different than that shown or may include additional or different operations not specifically illustrated with respect to FIG. 2.

In the example of FIG. 2, a page script of a page to be rendered by rendering engine within a browser interface of a browser application may be executed within a first execution environment, where the page script may be configured to interact with the page model to implement the rendering (202). For example, the rendering engine 126 may execute the page script 116 within the execution environment 140, so as to thereby render the page 110 within the browser window 108.

An extension file which modifies the functionality of the browser application in association with the rendering of the page may be executed, including a detection of a content script associated with the extension file which, during execution, interacts with the page model (204). For example, during an execution of the extension files 122, e.g., the background page 130, the extension manager 128 executing in conjunction with the rendering engine 126 may detect presence of the content script file 132. Moreover, as referenced, the environment manager 136 may be configured, based on the detection of the content script file 132, to create a separate execution environment 138 within the context of the rendering engine 126.

Thus, a second execution environment may be created for execution of the content script file therein by the rendering engine (206). For example, as just referenced, the environment manager 136 may create the content script environment 138 for execution of the content script file 132 therein.

Figure 3:
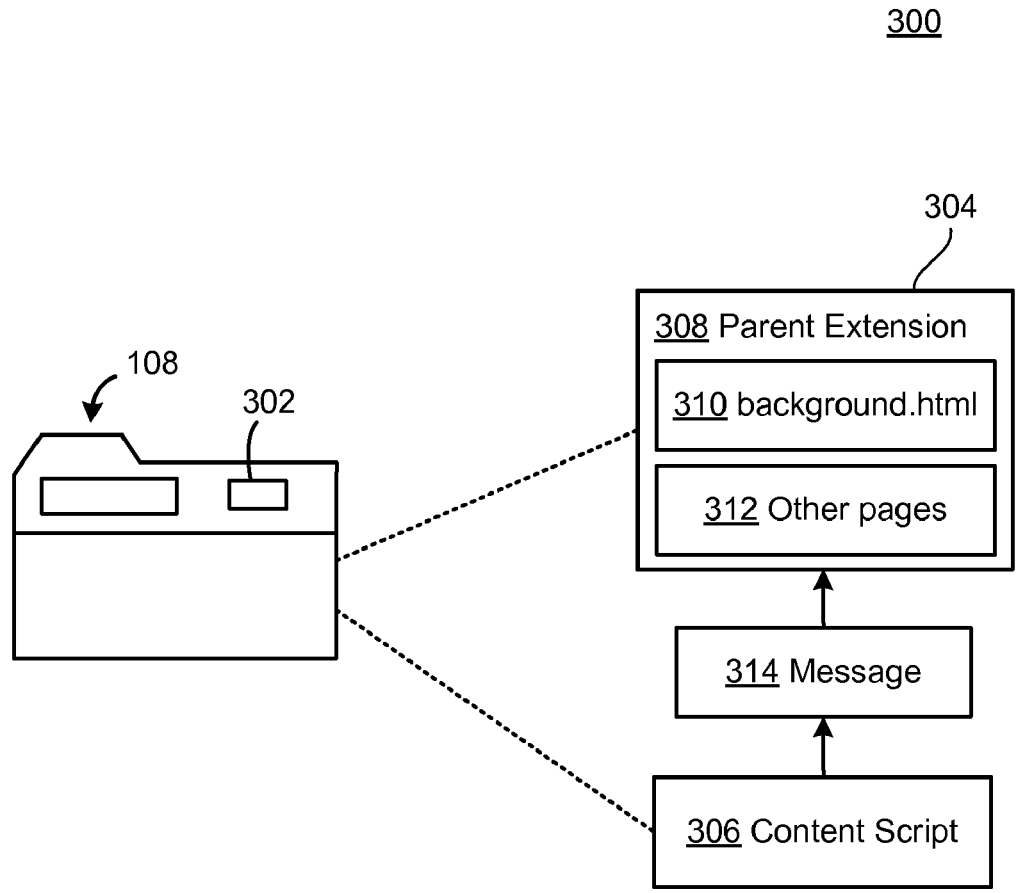
FIG. 3 is a block diagram illustrating a message exchange between the content script and a parent extension of the content script.

FIG. 3 is a block diagram illustrating example messaging techniques which may be implemented in the examples of FIGS. 1A and 1B. Specifically, as referenced above, content scripts may be configured to execute in a different execution environment from the rest of the extension file (e.g., the parent extension file including the background page file thereof). As referenced herein, the execution environment 138, similarly to the execution environment 140 of a page script of a webpage in question, may generally be unprivileged. On the other hand, other portions associated with the parent extension files may be privileged (e.g., may have access to privileged data and/or APIs).

As also referenced above, such privileged information may be protected through the use of messages sent between a content script and its parent extension, or between the parent extension and other known extensions. For example, in FIG. 3, an extension icon 302 is illustrated which is associated with an extension 304. Specifically, as shown, a parent extension 308 may include a background page file 310, as well as various other pages 312. The extension 304 may be associated with a content script 306 which may be configured to interact with and/or modify a webpage to be displayed within the browser display 108.

For example, the content script 306 may be written to examine any page loaded in the browser application 112 for rendering within the browser window 108 in order to detect a presence of a specific type of content (e.g., a non-linked webpage, or an RSS feed). That is, the content script 306 may execute such techniques on content of any webpage loaded and rendered within the browser window 108. In the event that the content script detects the specified type of content, the content script 306 may pass a message 314 to the parent extension 308 so as to notify the parent extension 308 of the detected presence of the specified type of content. In the example, the background page file 310, unlike the content script file 306 itself, may have access to perform an actual modification of the browser window 108, (e.g., to execute a page action with respect to browser window 108, such as displaying the extension icon 302).

For example, the content script 306 may use a "call to send request" to send the message 314 to a listener of the background page file 314 which is configured to detect such a send request. Upon detection and identification of the exact type of content as provided by the content script 306 via the message 314, the listener of the background page file 310 may be configured to execute a corresponding page action, e.g., display the extension icon 302 (and associated activities, such as detection of selection of the extension icon and performance of resulting responses thereto).

Thus, through the use of the messenger 142 and/or associated message APIs, the content script 306 may send the message 314 to a parent extension 308, to thereby trigger a desired action on the part of the parent extension 308. By enabling such communication, while restricting access of the content script 306 to APIs and data accessible by the parent extension 308, the example of FIG. 3 illustrates that any such data or other information which may be privileged may be protected from improper or undesired use thereof via the content script 306.

Further, in addition to the parent extension as just described, other privileged extension APIs may be made available to the content script from within the execution environment 138, as well, while also keeping such privileged extension APIs isolated from the page 110 itself. For example, the messaging techniques of FIG. 3 may be used to grant access to cross origin requests by the content script (specifically, as is known, "origin" in this context refers generally to the concept that page scripts of pages of a given site may cross-access one another, while page scripts of different sites may not). In general, extensions may communicate with remote servers that are not in their respective origins (if cross-original permission is granted), and, using the methods of FIG. 3, the content script 306 also may do so (indirectly) by sending a message such as the message 314 to the parent extension 308 that asks the parent extension 308 to make the cross-origin request on its behalf. In another example, the content script 306 may access a context menu API associated with the parent extension 308, which may, e.g., provide additional items within a pop-up window provided in response to a "right-click" of the mouse (or corresponding action for other human interface devices) by the user while viewing the page 110.

Figure 4:
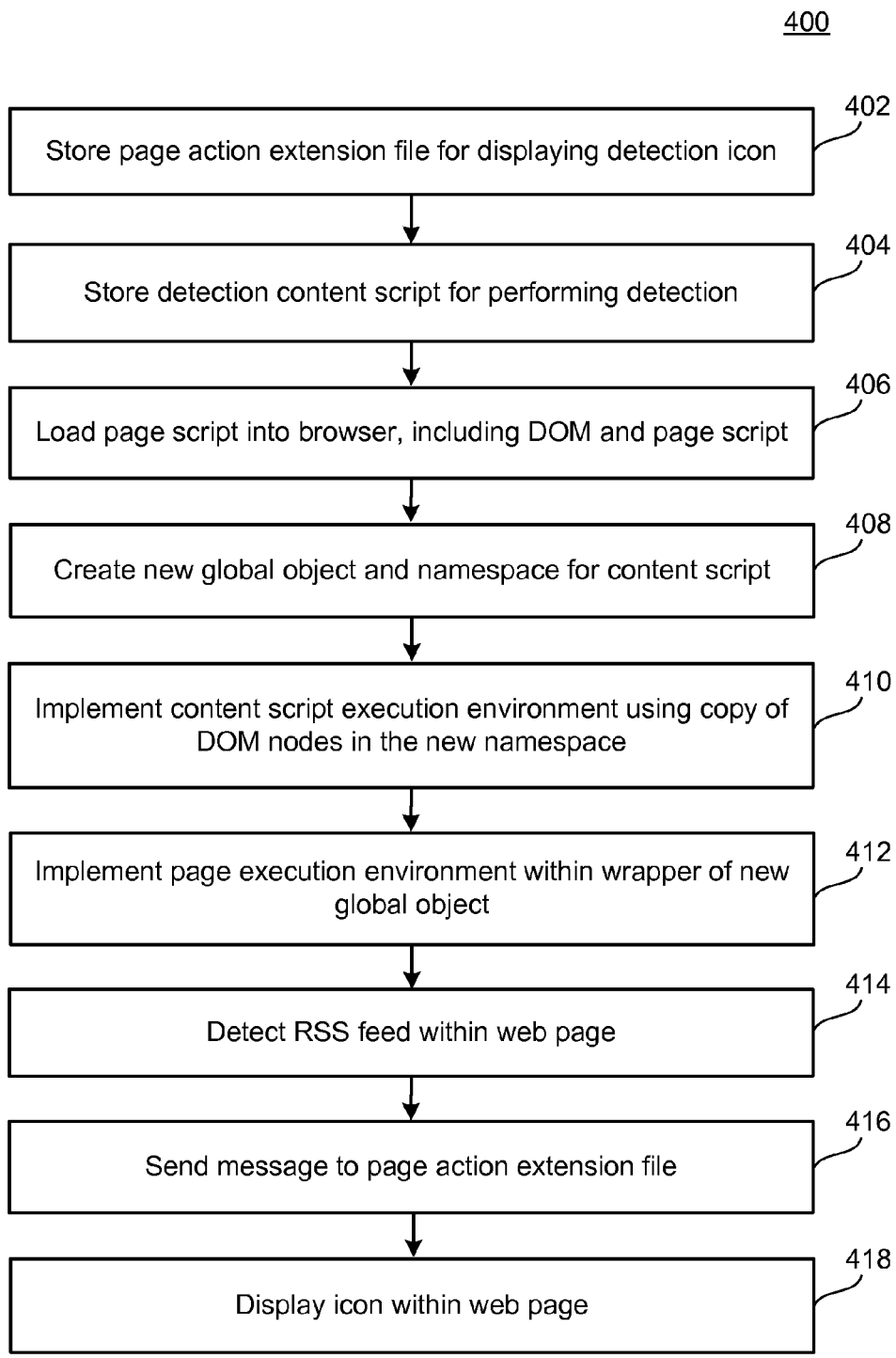
FIG. 4 is a flowchart illustrating more detailed example operations of the system of FIG. 1A, in an example context of the message exchange operations of FIG. 3.

FIG. 4 is a flowchart 400 illustrating more detailed example operations of the system 100a of FIG. 1A, in the context of the examples of FIGS. 1B, 2, and 3. In the example of FIG. 4, in a first instance, a page action extension file may be stored which includes the ability to display (and perform other activities associated with) a detection icon (402). For example, the extension file 122 may include a background page file 130 (represented by the files 308, 310, of FIG. 3), for a potential resulting page action of display of the detection extension icon 302.

A detection content script for performing a defined detection of specific content within loaded webpages also may be stored (404). For example, the content script file 132 of FIG. 1A, represented by the content script 306 in the example of FIG. 3, may be configured to examine the page model, (e.g., DOM) 114 of a page 110 to be loaded, to thereby inspect content thereof for inclusion of the desired content (e.g., for inclusion of an RSS feed).

Subsequently, a particular page and associated page script may be loaded into an associated browser, including, for example, an associated DOM and page script (406). For example, the page 110 may be loaded by the browser application 112 into the rendering engine 126 for a display within the browser window 108, while the DOM 114 and the page script 116 may be loaded from temporary memory 118 and/or from remote device 104 (406).

In the example of FIG. 4, in conjunction with anticipated execution of the content script, e.g., the content script 306, a new global object and name space for the content script may be created (408). For example, as described, upon loading of the page 110 by the rendering engine 126, the extension manager 128 may determine a presence and desired use of the extension files 122/304, as well as the associated inclusion of the content script 132, 306. In response, the environment manager 136 may create the above-referenced new global/window object to thereby create a name space for the detected content script which is independent from the name space of the page script 116.

Consequently, the content script execution environment 138 may be executed including providing direct access to the nodes of the DOM 114, within the newly created name space (410). In an overlapping or simultaneous context, a separate page execution environment 140 may be implemented in which the page script 116 may execute (412). In the example, specifically, the page execution environment may be associated with an otherwise conventional global/window object associated with the page script 116, which may execute within a wrapper defined by the new global object previously described and created with respect to the environment manager 136.

Consequently, the content script 306 may execute to detect a presence of a RSS feed within the webpage 110 (414). As a result, as described above with respect to FIG. 3, the content script 306 may send the message 314 to a corresponding extension file associated with a page action desired to take place in response to the detection of the RSS feed (416). For example, as described, the message 314 may be sent to the background page file 310.

Therefore, the receiving extension file (e.g., the background page file 310) may perform its configured page action. For example, as illustrated with respect to FIG. 3, the background page file 310 may execute a page action designed to modify the browser window 108 to include the icon 302 representing an extension icon (e.g., a detection icon in the present example, which is designed to indicate the presence of the RSS feed within the content of the page 110 to the user of the browser window 108).

As a result of the systems and methods described herein, developers of extensions may be enabled to utilize and leverage familiar page structures such as, for example, the DOM 114 and associated page script 116, when developing extensions which include, or are associated with, injectable content scripts. Further, within such a familiar and convenient environments, the extension developer is nonetheless assured of being provided with an ability to create and execute a desired functionality of the content script, without significant concern for disrupting the stable operation of virtually any webpage which may later be loaded by the browser application 112 for the rendering engine 126.

Further, in the systems and methods described herein, such content script files may be executed in a manner which minimizes or eliminates an ability of such loaded webpages to utilize the designed content script for unauthorized or undesired access to the privileged data 124. As described herein, through the use of isolated worlds for execution environments of page scripts associated with the loaded webpages, as compared to content scripts associated with developed extensions, extension developers and programmers may be enabled to develop, create, and provide desired extension functionality and features in a stable, secure manner. As a result, potential users of such extensions may be provided with a wide variety thereof, and may utilize a desired extension in a manner with which the user is comfortable, with respect to the stable and secure operation thereof.

Figure 5:
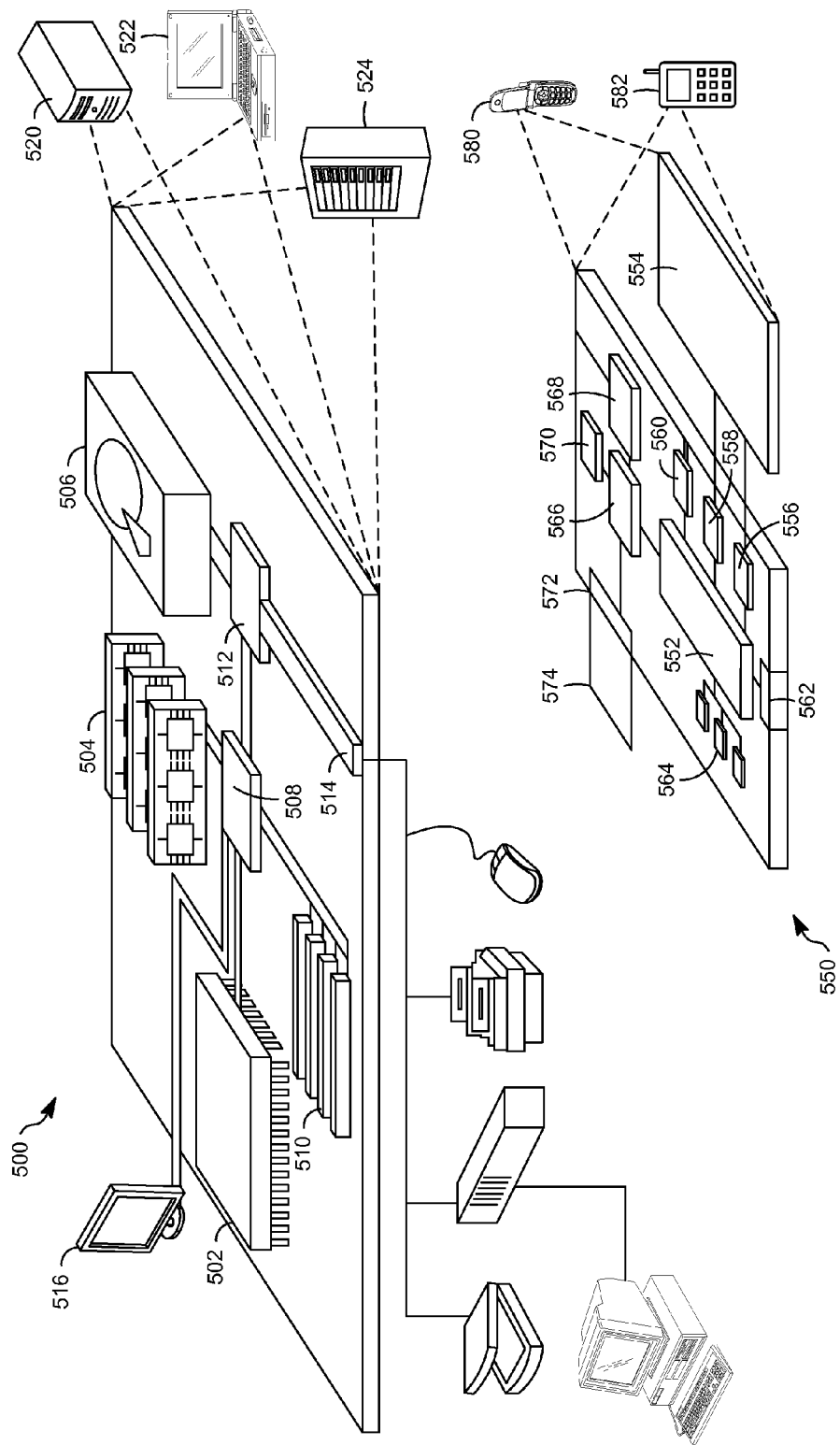
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a computer-readable medium and executable by at least one processor to execute a browser application and thereby provide a browser interface, the computer system comprising:
the at least one processor;
a rendering engine configured to cause the at least one processor to execute, within a first execution environment of the rendering engine, a page script of a page to be rendered within the browser interface, the page script configured to interact with a page model to implement the rendering of the page;
an extension manager configured to cause the at least one processor to render, in an extension execution environment, at least a portion of an extension file which is configured to modify a functionality of the browser application in association with the rendering of the page by the rendering engine, including detecting a content script associated with the extension file which, during execution, interacts with the page model; and
an environment manager which is configured to cause the at least one processor to create a second execution environment of the rendering engine for execution of the content script file therein, including providing a copy of the page model within the second execution environment of the rendering engine,
wherein the content script, during execution within the second execution environment of the rendering engine, interacts with the copy of the page model independently of how the page script, during execution within the first execution environment of the rendering engine, interacts with the page model,
and further wherein the extension manager is configured to cause the at least one processor to render the at least a portion of the extension file based on the execution of the content script within the second execution environment of the rendering engine.

2. The computer system of claim 1, wherein the content script is configured to send a message to the first execution environment of the rendering engine and the page script is prevented from accessing the second execution environment of the rendering engine.

3. The computer system of claim 1, wherein the environment manager is configured to provide a separate namespace for the second execution environment of the rendering engine relative to a namespace of the first execution environment of the rendering engine.

4. The computer system of claim 1, wherein the page model is associated with a global object which is at least indirectly a parent of all other objects of the page model, and wherein the environment manager is configured to provide a new global object associated with the second execution environment of the rendering engine as a wrapper of the global object.

5. The computer system of claim 1, wherein the second execution environment of the rendering engine is not accessible by the page script and/or by a second content script associated with a second extension file.

6. The computer system of claim 1, wherein the extension file includes a parent extension file of the content script.

7. The computer system of claim 6, wherein the environment manager includes a messenger configured to send a message between the content script and the parent extension file.

8. The computer system of claim 6 wherein the parent extension file includes a browser action file configured to cause the browser application to perform a functionality independently of the page, and/or a page action file configured to cause the browser application to perform a functionality which is dependent upon the page.

9. The computer system of claim 1 wherein the content script is configured to interact with the copy of the page model to thereby modify objects of the copy of the page model and thus modify the rendering of the page.

10. The computer system of claim 1 wherein the page model includes a Document Object Model (DOM) and the page script and the content script include Javascript.

11. A computer program product, the computer program product being tangibly embodied on a non-transitory computer-readable medium and including executable code that, when executed, is configured to cause a data processing apparatus to:
execute, within a first execution environment of a rendering engine, a page script of a page to be rendered within a browser interface of a browser application, the page script configured to interact with a page model to implement the rendering of the page;
render, in an extension execution environment, at least a portion of an extension file which is configured to modify a functionality of the browser application in association with the rendering of the page by the rendering engine, including detecting a content script associated with the extension file which, during execution, interacts with the page model; and
create a second execution environment of the rendering engine for execution of the content script file therein, including providing a copy of the page model within the second execution environment of the rendering engine,
wherein the content script, during execution within the second execution environment of the rendering engine, interacts with the copy of the page model independently of how the page script, during execution within the first execution environment of the rendering engine, interacts with the page model,
and further wherein the rendering of the at least a portion of the extension file is based on the execution of the content script within the second execution environment of the rendering engine.

12. The computer program product of claim 11, wherein the content script is configured to send a message to the first execution environment of the rendering engine and the page script is prevented from accessing the second execution environment of the rendering engine.

13. The computer program product of claim 11, wherein the content script is configured to interact with the copy of the page model to thereby modify objects of the copy of the page model and thus modify the rendering of the page.

14. A computer-implemented method including executing instructions stored on a computer-readable medium, the method comprising:
executing, within a first execution environment of a rendering engine, a page script of a page to be rendered within a browser interface of a browser application, the page script configured to interact with a page model to implement the rendering of the page;
rendering, in an extension execution environment, at least a portion of an extension file which is configured to modify a functionality of the browser application in association with the rendering of the page by the render ing engine, including detecting a content script associated with the extension file which, during execution, interacts with the page model; and creating a second execution environment of the rendering engine for execution of the content script file therein, including providing a copy of the page model within the second execution environment of the rendering engine, wherein the content script, during execution within the second execution environment of the rendering engine, interacts with the copy of the page model independently of how the page script, during execution within the first execution environment of the rendering engine, interacts with the page model, and further wherein the rendering of the at least a portion of the extension file is based on the execution of the content script within the second execution environment of the rendering engine.

15. The method of claim 14, wherein creating the second execution environment of the rendering engine comprises:

providing a separate namespace for the second execution environment of the rendering engine relative to a namespace of the first execution environment of the rendering engine.

* * * * *